United States Patent [19]

Irwin et al.

[11] Patent Number: 4,873,682

[45] Date of Patent: Oct. 10, 1989

[54] DIGITAL KEY TELEPHONE SYSTEM

[75] Inventors: George F. Irwin, Kanata; Paul J. Smelters; David J. Robertson, both of Ottawa, all of Canada; Ronald J. Maginley, Ann Arbor, Mich.

[73] Assignee: Northern Telecom Limited, Montreal, Canada

[21] Appl. No.: 126,710

[22] Filed: Nov. 30, 1987

[51] Int. Cl.⁴ .............................................. H04Q 11/04
[52] U.S. Cl. ...................................... 370/58.1; 370/62
[58] Field of Search ................. 370/58, 62, 67, 110.1; 379/156, 158, 165

[56] References Cited

U.S. PATENT DOCUMENTS

| | | | |
|---|---|---|---|
| 4,430,733 | 2/1984 | Hardy et al. | 370/110.1 |
| 4,514,597 | 4/1985 | Kikuchi et al. | 179/99 M |
| 4,602,132 | 7/1986 | Nagatomi et al. | 179/99 R |
| 4,615,028 | 9/1986 | Lewis et al. | 370/58 |
| 4,730,304 | 3/1988 | Mezera et al. | 370/58 |
| 4,763,316 | 8/1988 | Schaich et al. | 370/58 |

Primary Examiner—Douglas W. Olms
Attorney, Agent, or Firm—Foley & Lardner, Schwartz, Jeffery, Schwaab, Mack, Blumenthal & Evans

[57] ABSTRACT

Communication paths in a digital key telephone system are operated by sequentially transferring bit states from origin channels associated with communication ports to exclusively dedicated time slots in a parallel transmission medium. Time slot bit states are selectively stored at designated memory locations corresponding to destination channels associated with the communication ports. The memory locations are read in synchronism with the channel occurrences and bit states from the designated memory locations are asserted in the corresponding channels, any remaining channels having predetermined bit states asserted therein.

11 Claims, 7 Drawing Sheets

DIGITAL KEY TELEPHONE SYSTEM

The invention is in the field of telephone communications apparatus and methods, and more particularly relates to small telephone systems and the like, sometimes referred to as key telephone systems.

BACKGROUND OF THE INVENTION

Telephone systems of various sizes are also of various corresponding architectures. For example, central exchanges are usually large and characteristically are designed to include concentration of telephone lines in switching networks operated by a central controller complimented by various peripheral controllers. In the interest of extreme reliability, the central controller, switching network, and even some of the peripheral controllers are duplicated to achieve functional reliability through redundancy. Extensive maintenance software is provided to manage these elements so that in spite of inevitable randomly occurring failures or malfunctions, service to telephone subscribers continues to be substantially uninterrupted. In contrast, private branch exchanges (PBXs) tend to be smaller and more cost sensitive. PBX architectures are usually similar to that of central exchanges, however, with less duplication and redundancy and consequently less functional reliability. Advantages of the typical time division multiplex, pulse code modulation switching exchange are many, however one of the outstanding advantages is that of being adaptable to carry voice and or data signals typically at a base rate of 64 Kb/s, or for example in accordance with recent integrated service digital network (ISDN) recommended standards. Another advantage, exemplified in a typical modern telephone exchange, is that a plurality of directory or extension numbers may appear at any one telephone set while only a single telephone line actually connects the telephone set to the exchange.

Some examples of very small telephone systems are generally referred to as key telephone systems. Traditionally a key telephone system is provided by extensive telephone line and control lead wiring between key telephone sets. Each key telephone line extends to a telephone exchange. Each of the telephone sets includes a plurality of push button switches or keys, each for connecting the telephone set to a particular telephone line among a plurality of telephone lines routed to the key telephone set. The switching function of line selection is mechanically provided and distributed among the key telephone sets. Any features in addition to plain ordinary telephone service (POTS) must be added on a per line basis. The primary advantage of these systems is economy with small size. However, if such a system is required to expand along with the organization it serves, over a time it eventually becomes more expensive on a per line and feature basis than a private branch exchange would be. Key telephone systems are also characteristically of the analog signal type, and therefore are impractical to interface with an ISDN as will likely be desired by business customers in the near future.

SUMMARY OF THE INVENTION

It is an object of the invention to provide a telephone system wherein the functional advantages of key telephone systems and digital signal communications are co-existent via key telephone sets each connected to the system by a single telephone line.

In one example a key telephone system is provided wherein time division multiplexed signals are exchanged between telephone sets by means of one or more time switches. Each time switch is modular such that a time switch module is capable of handling only those traffic requirements of a small group of telephone line appearances. Hence, the bulk of the switching equipment is modularly incremental such that cost is substantially proportional to the number of key telephone sets served by the system.

In accordance with the invention a key telephone system for providing digital signal communication paths between a plurality of digital signal instruments and for providing a communication link between any of the digital signal instruments and a communication channel associated with a telephone exchange, comprises a switching means being operable to provide communication paths between time division multiplexed transmit (TDMT) channels and time division multiplexed receive channels (TDMR) channels. A plurality of time division multiplex (TDM) communication paths each includes n pairs of the TDMT and TDMR channels in transmit and receive bit streams respectively. The digital signal instruments are each connectable with the key telephone systems by respective ones of a plurality of digital signal communication paths. An internal port means is associated with one of the TDM communication paths, for receiving information from a plurality of the TDMR channels and for transmitting corresponding information to prearranged corresponding ones of the plurality of digital signal communication paths, and for receiving information from said ones of said digital signal communication paths and transmitting corresponding information to the corresponding TDMT channels An external port means couples information signals between the communication channel associated with the telephone exchange and at least one pair of the TDMR and TDMT channels. A call controller is responsive to signals from any of the digital signal terminals and the telephone exchange for directing call progress operations of the switching means.

A method for operating a digital signal communication path in a digital key telephone system in accordance with the invention includes the steps of:
 (a) sequentially transferring bit states, from a serial frame and origin channel organized first transmission medium, to exclusively dedicated time slots in a parallel frame organized transmission medium;
 (b) designating at least one of said time slots from which bit states are to be stored in a first memory having a plurality of memory locations each corresponding to possible destination channels of a serial frame and channel organized second transmission medium, designating one of said memory locations in association with each of said designated time slots and with each occurance of a designated time slot, storing said bit states in said designated memory location;
 (c) in synchronism with the channel occurrences of the second transmission medium reading each of the corresponding memory locations;
 (d) asserting bit states, while being read from each designated memory location, in a second parallel organized transmission medium and otherwise asserting predetermined bit states;

(e) capturing the bit states as they occur in the second parallel organized transmission medium and asserting the last captured bit states serially during the corresponding instant channel of the serial frame and channel organized second transmission medium whereby information is transmitted into the digital key telephone system in an origin channel and routed out of the digital key telephone system in a destination channel.

This method may also include the further steps of:

(f) designating one other of said time slots from which bit states are to be stored in a second memory, having at least one memory location, and storing said bit states therein;

(g) designating a channel in the serial frame and channel organized second transmission medium;

(h) asserting the bits states, stored in the memory location of the second memory, in a third parallel organized medium at a time corresponding to an occurrence of channel designated in step (g);

(i) selecting one of the second and third parallel organized mediums in accordance with which of the respective bit states asserted therein is of a higher value, and;

in step (e) capturing said bit states from the selected medium, whereby the information in one of two origin channels is selected and routed out of the digital key telephone systems in said destination channel, to provide a voice conference function at a telephone station set corresponding to the destination channel.

BRIEF DESCRIPTION OF THE DRAWINGS

An example embodiment is described with reference to the accompanying drawing in which.

INTRODUCTION OF THE EXAMPLE EMBODIMENTS

Figure 1:
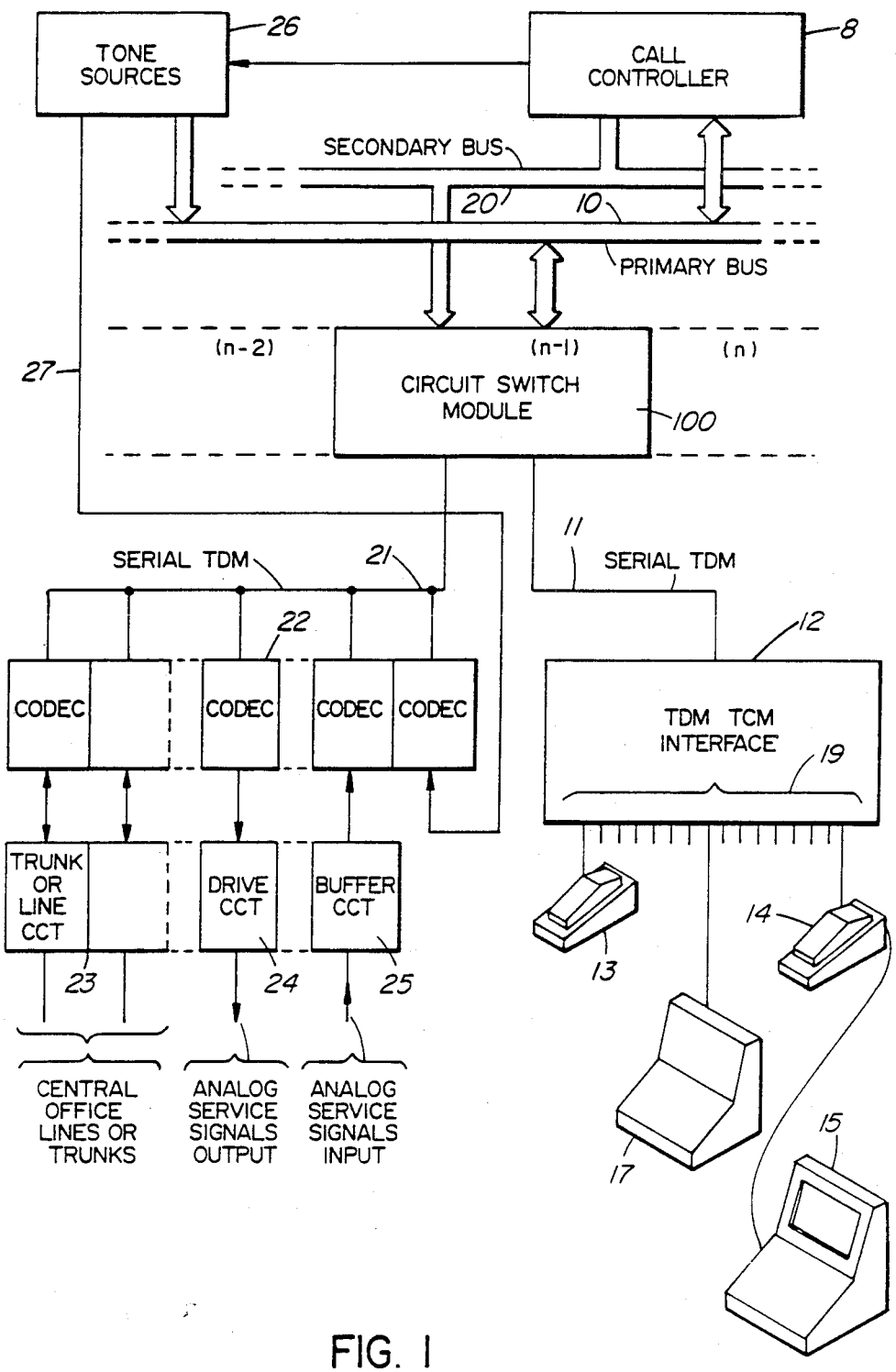
FIG. 1 is a block diagram of a key telephone system in accordance with the invention.

In FIG. 1 a digital key telephone system provides for connection of various digital telephone instruments, as exemplified at 13 and 14, and various digital data terminals, personal computers or the like, as exemplified at 15 and 17, which are able to communicate, via the system, with one another as appropriate, and with other devices via line or trunk circuits 23. The lines and or trunks serve to connect the digital key telephone system with other telephone facilities, for example a central office or private exchange, not shown. A back bone of the digital key telephone system is provided by a short parallel time division multiplex (TDM) bus 10, which provides a wide band communication path between up to nine 64 channel circuit switch modules 100, a call controller 8 and tone sources 26. If any of the tone sources 26 provide an analog signal, such is coupled into the system via a lead 27. The bus 10 is referred to as a primary bus, and a secondary bus 20, similar to the primary bus 10, provides for unidirectional communications from the call controller 8. Each of the circuit switch modules 100 couples 64 ten bit transmit serial channels to predetermined corresponding time slots in the bus 10, and up to 64 parallel selected TDM time slots on either of the buses 10 or 20 to 64 ten bit receive serial channels. 32 of the serial transmit and receive channels are coupled to an internal ports circuit 12 via a serial TDM path 11. The remaining 32 serial transmit and receive channels are coupled to external port circuits at 22 via a serial TDM path 21. Each of the channels is capable of transmitting a binary signal pulse stream at a rate of 80 kilo bits per second, with at least 64 kilo bits per second being available as a channel for pulse code modulated (PCM) voice information, or data information. the remaining sixteen kilobits per second sub maybe committed to supervisory and signalling communications in association with the PCM or data information, or may be used for any other convenient purpose. In this example the internal ports circuit 12 consists of sixteen TDM time compression multiplex (TMC) interfaces. The TMC method of signal transmission is sometimes referred to as "Ping Pong" transmission. Each of these interfaces provides a transmit path between each of TCM links 19 and two predetermined and fixed serial TDM channels in the serial TDM path 11. In a similar manner analog signals are interfaced to and from various trunk or line circuits at 23, and or drive or buffer circuits at 24 and 25, with the serial TDM path 21 via the external ports 22 provided by CODEC circuits. Alternately, it may be advantageous to provide an external TDM port for interfacing with another telephone facility via a digital signal transmission link, T1 or DS30 for example. However in this case, each CODEC circuit interfaces with a predetermined and fixed transmit and receive channel pair of the serial TDM path 21. Hence, for each and every line appearance (that is a place where a digital telephone instrument or other digital device or a digitally interfaced or compatible line, trunk and the like may be connected to the digital key telephone system), there is at least one predetermined ten bit parallel time slot in the primary bus 10 which is allocated to receive information from the line appearance. In an alternate example, the time slots on the bus 10 correspond to line appearances for the purpose of transmitting information thereto. However, such alternate example is not herein further discussed The call controller 8 and one or more tone sources 26 are connected to the primary bus 10 for communication via a remaining 64 of the ten bit parallel time slots. The call controller 8 may receive all ten bits of each time slot on the bus 10. Normally, only the two bits corresponding to a sixteen kilobit sub-channel are received from the bus 10 by the call controller 8, for purposes of call control. The call controller 8 provides signalling and supervision via the secondary bus 20 at time slot occurrences corresponding to intended line appearance destinations via the appropriate circuit switch module 100, but without time switching. Therefore each circuit switch module 100 transmits 10 bits to the primary bus 10 but receives only 8 bits from the primary bus 10, the other two bits being received via the secondary bus 20. Significant economy, particularly in smaller scale examples of this digital key telephone system are realized from this structure. This structure provides the circuit switching capability, in this otherwise hard wired time division arrangement. If the digital key telephone system is to be expanded, the addition of another circuit switch module 100 and the necessary internal and or external ports 12 and 22, as required, provides for service to an additional 64 TDM channel appearances.

DETAILED DESCRIPTION

A more detailed discussion of the structure and operation of the modular circuit switch module 100 is with reference to FIGS. 2–11.

Figure 2:
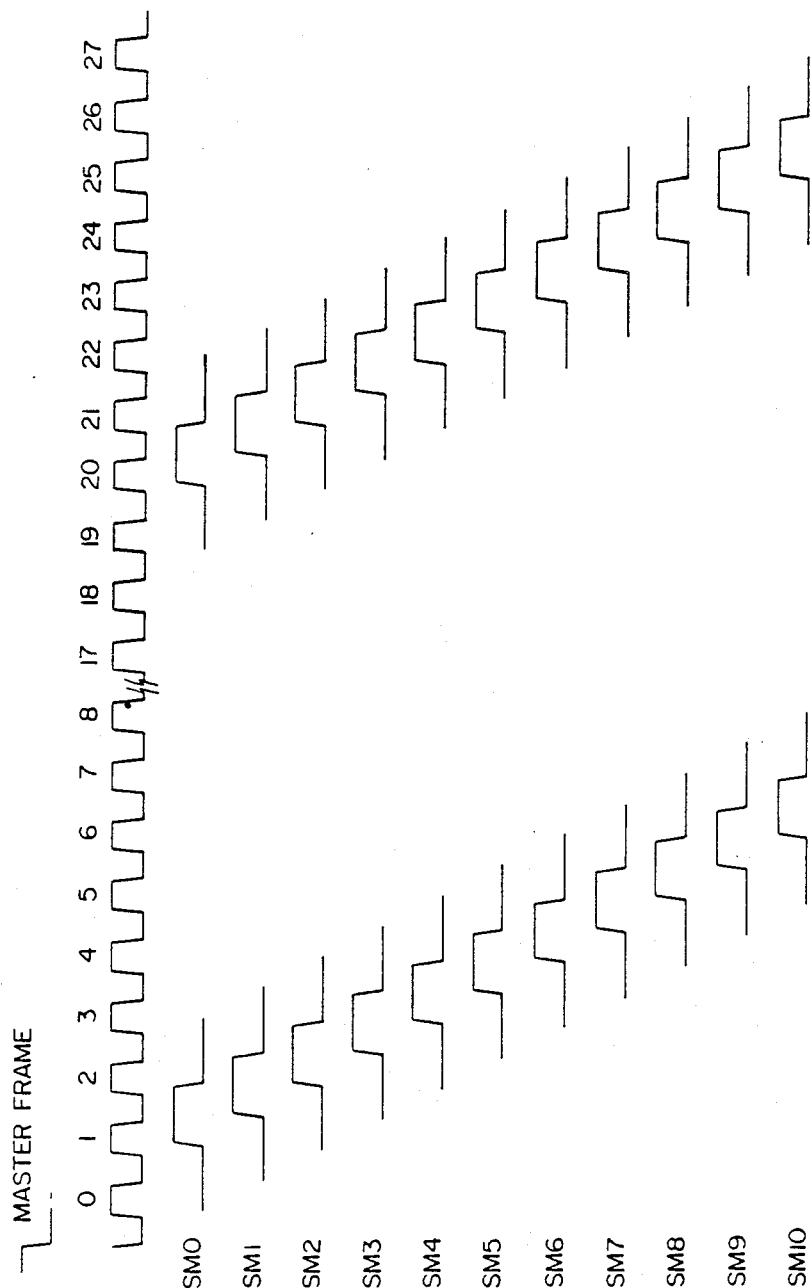
FIG. 2 is a graphical illustration of operating timing pulses and or signals generated within a circuit switch module used in FIG. 1.
Figure 3:
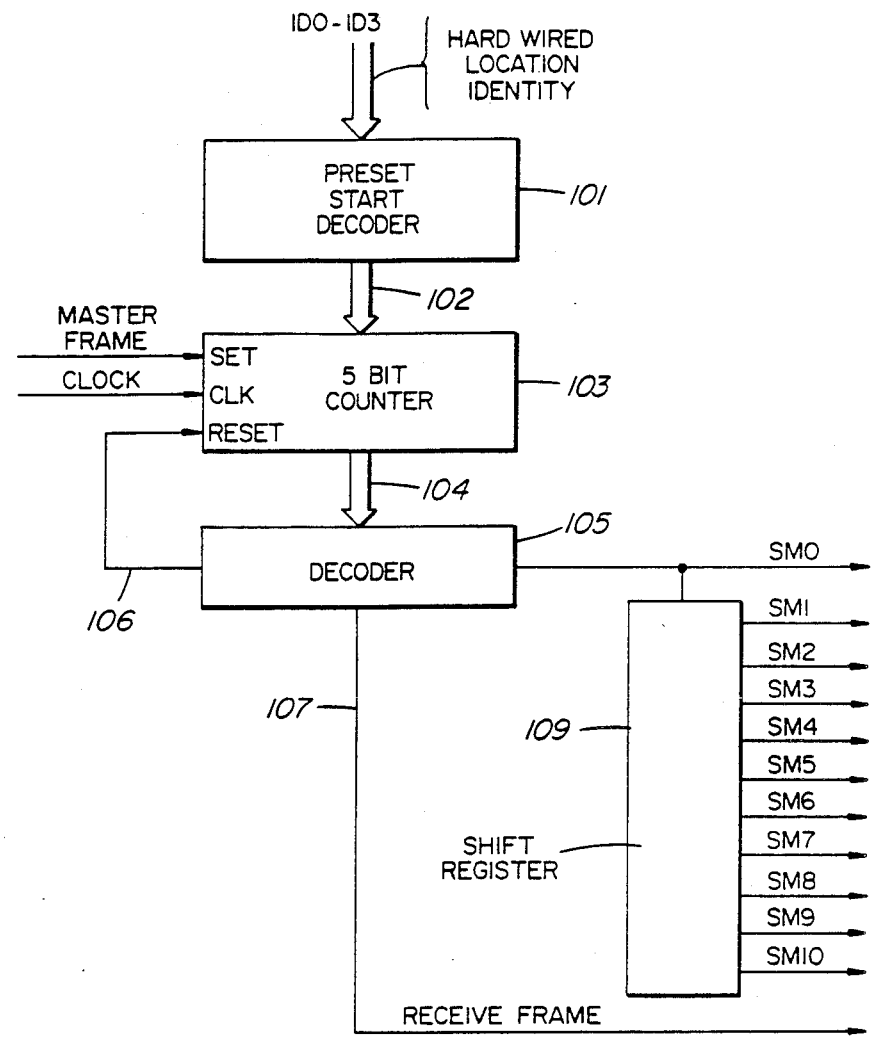
FIG. 3 is a block diagram of a timing sequence generator used in the circuit switch module for providing the timing signals illustrated in FIG. 2.

In order that each of one or more circuit switch modules 100 be able to transfer information from the serial TDM paths 11 and 21 to the parallel TDM bus 10 without contention, a phased timing sequencer, as shown in FIG. 3, resides within each of the modules 100 for regulating the functions of the module. Wave forms exemplified in FIG. 2 illustrate a master frame timing pulse occurring at a rate of 1 Khz, clock pulses numbered 0–27 occurring at a rate of 5.12 MHz and state machine timing pulses SM0–SM10. With the switch module 100 installed in the system, a preset start decoder 101 is connected to a hard wired location, not shown, which provides an identity, that is a fixed four bit binary word, ID0–ID3. The combination of the signal states of the bits ID0–ID3 is unique for each possible switch module location in the digital key telephone system. The preset start decoder 101 generates a 5 bit binary word on a bus 102, in response to the combination of bit states as shown in table 1. A five bit counter 103 is preset by each occurrence of the master frame pulse, to correspond to the word on the bus 102 and thereafter is incremented with each occurrence of a clock pulse. An output 104 of the counter 103 is decode by a decoder 105 which generates a reset signal on a lead 106 which each occurrence of a count of 19 in the counter 103. Thus with the occurrence of the next clock pulse, the counter 103 is reset to a count if zero. Thus a module 20 counting function is provided, which is phased as is illustrated in table 1.

TDM path 11 is inserted onto the parallel TDM bus 10 in time slot zero, channel one in time slot 20 and so on until the last channel, channel 31, of a serial TDM frame is inserted into time slot 620.

Stated in other terms, each TDM path has 32 parallel ten bit receiving channels assigned to it on the primary bus 10, and each of these channels is separated from the other by 19 other channel occurrences.

The decoder 105 also generates an SM0 timing pulse, coincident with the count of 19 occurring in the counter 103. A shift register 109 responds to the SM0 timing pulse and the clock pulses to generate additional timing pulses SM1–SM10 as illustrated in FIG. 2.

Figure 4:
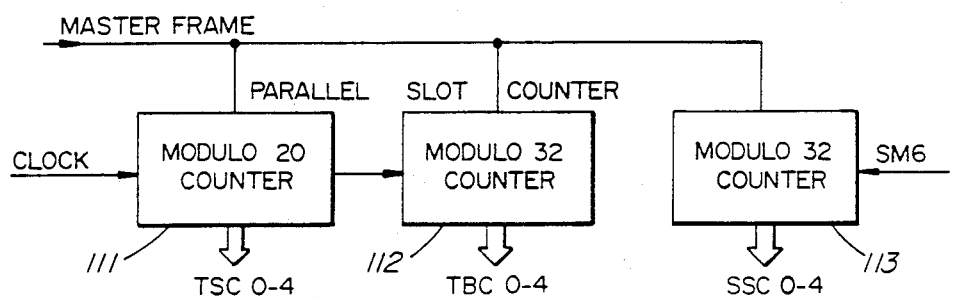
FIG. 4 is a block schematic diagram of counters, used in a circuit switch module in FIG. 1, and arranged to provide time slot and channel addresses for operation of the circuit switch module.

Referring to FIG. 4, the time slot occurrences on the parallel TDM bus 10 are tracked by a parallel slot counter which includes a modulo 20 counter 111 and a modulo 32 counter 112. The counter 111 responds to the 5.12 MHz clock pulses to provide repetitive counts of 0 through 19 on five time slot count leads TSC 0–4. The counter 112 is incremented with each reset occurrence in the counter 111 to provide repetitive counts of 0 through 31 on five time block count leads TBC 0–4, whereby in combination binary signals on the TSC and TBC leads define 640 parallel time slot addresses per frame. A serial channel counter function is provided by a counter 113 which provides 32 channel counter addresses on serial channel count leads SCC 0–4 to define channel occurrences in the serial TDM paths 11 and 21. The counter 113 is incremented with each time block occurrence as indicated by the timing pulse SM6. All of the counters 111, 112 and 113 are reset with each Occurrence of the master frame pulse.

Figure 5:
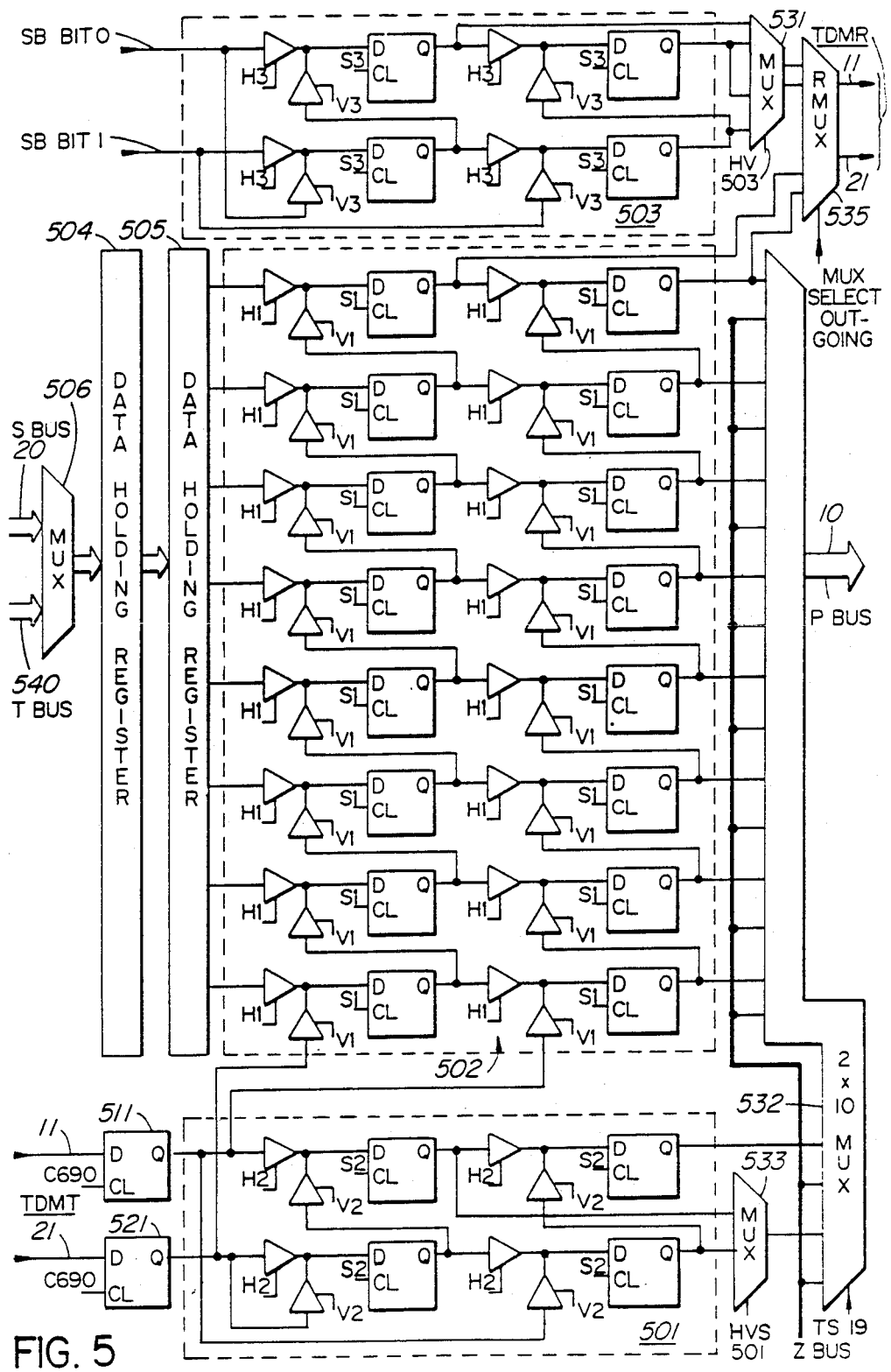
FIG. 5 is a block schematic diagram of a converter circuit used in the circuit switch module in FIG. 1.

The converter circuit illustrated in FIG. 5 resides within the circuit switch module 100 and performs both serial to parallel conversions and parallel to serial conversions for each of the 64 TDMT and the 64 TDMR channels on the TDM paths 11 and 21. As before mentioned, the TDMT channels are incoming and carry data or voice, plus signalling bits originating at the terminal instruments, while the corresponding TDMR channels are outgoing, each to the originating terminal instrument. Each incoming time slot includes 10 binary bits which are converted directly to parallel form and asserted during the predetermined time slot interval on the primary bus 10. Each outgoing time slot includes 10 binary bits which are obtained from one of two sources: one source being a corresponding time slot interval on the secondary bus 20; the other source being 8 bits from any time slot interval on the primary bus 10, the 8 bits having traversed the time switch, plus 2 bits from the time slot interval on the secondary bus 20 corresponding to the TDMR channel occurence.

TABLE 1

| CIRCUIT SWITCH MODULE | ID3 | ID2 | ID1 | ID0 | PRESET VALUE OF BUS 102 | TDM-11 FRAME AND TIME SLOT CORRESPONDENCE | TDM-21 FRAME AND TIME SLOT CORRESPONDENCE |
|---|---|---|---|---|---|---|---|
| 0 | 0 | 0 | 0 | 0 | 18 | 0 | 2 |
| 1 | 0 | 0 | 0 | 1 | 17 | 1 | 3 |
| 2 | 0 | 0 | 1 | 0 | 14 | 4 | 6 |
| 3 | 0 | 0 | 1 | 1 | 13 | 5 | 7 |
| 4 | 0 | 1 | 0 | 0 | 10 | 8 | 10 |
| 5 | 0 | 1 | 0 | 1 | 9 | 9 | 11 |
| 6 | 0 | 1 | 1 | 0 | 6 | 12 | 14 |
| 7 | 0 | 1 | 1 | 1 | 5 | 13 | 15 |
| 8 | 1 | 0 | 0 | 0 | 2 | 16 | 18 |

Figure 6:
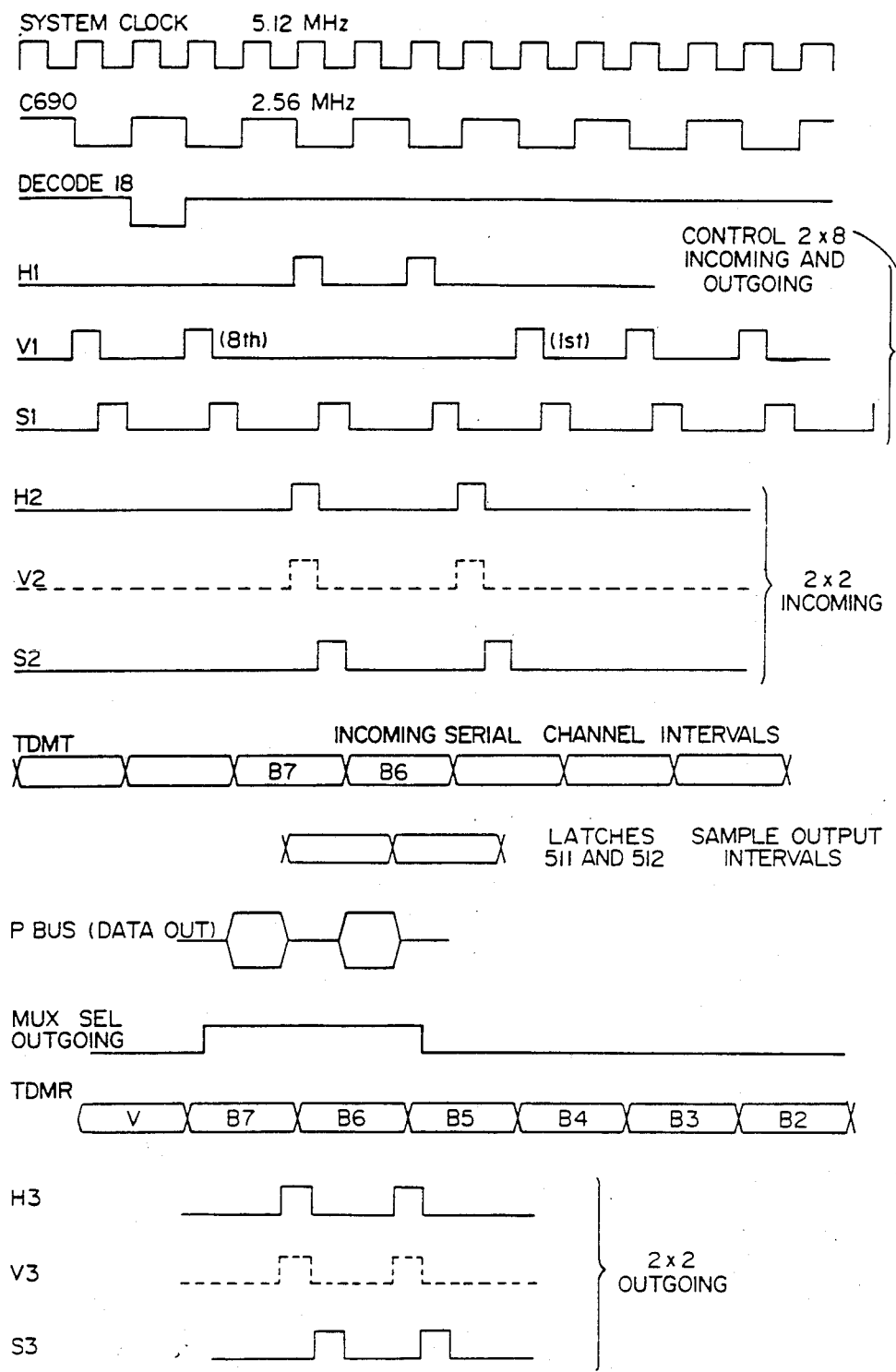
FIG. 6 is a graphical illustration of various timing signals used in the operation of the converter circuit in FIG. 5.

In accordance with the table, for example for the circuit switch module 0, the channel zero on the serial The converter circuit is discussed in more detail with reference to the timing signals illustrated in FIG. 6. A SYSTEM CLOCK waveform shown at the top of FIG. 6, and some of the other waveforms in FIG. 6 are idealistically depicted for convenience as having vertical rise and fall portions. Actually, in practice these waveforms have sloped rise and fall portions similar to those waveforms illustrated in FIG. 2, which are more realistically depicted. The converter circuit includes three orthogonal shift registers shown at 501, 502 and 503 respectively. These three registers perform the required serial to parallel, and parallel to serial conversions. Each of the orthoganal shift registers 501, 502 and 503 is associated with a clock generator, not shown, which produces non-overlapping timing signals, illustrated in FIG. 6, for shifting and directional control. Vertical directional control signals V1, V2 and V3 are used to vertically direct shift functions of the register 502, 501 and 503 respectively. Horizontal directional control signals H1, H2 and H3 are used to horizontally direct shift functions of the registers 502, 501 and 503. The actual loading of D type flip flop elements in the regisitors 502, 501 and 503 is clocked by signal pulses S1, S2 and S3. The control signals V2 and V3 are shown in broken line to indicate that these signal pulses are 20 system clock periods removed from the adjacent H2 and H3 signal pulses, such that each commences at 40 system clock intervals. Bits of the TDMR serial bit streams are timed to be coincident with the rising edges of a serial digital loop clock signal C690. Bits of the TDMT serial bit streams on the paths 11 and 21 are sampled and re-timed to likewise be co-incident, by latches 511 and 521. A half cycle of the system clock prior to the rising edge of the serial digital loop clock signal C690, contents of the (2 by 8) outgoing register 502 are selected by a receive multiplexor 535 to provide the first bits of each of the TDMR channels at 11 and 21. The receive multiplexor selection is in response to a MUX SEL OUTGOING control signal shown in FIG. 6. The outgoing bits are timed by the rising edge of the clock signal C690 to start transmission of a 10 bit time slot. Shortly thereafter, while the starting bits of the corresponding TDMT channels are sampled by the latches 511 and 521 using the falling edge of the same clock signal C690. The sampled bits are then applied to the (2 by 2) incoming register 501. During the said same clock signal C690, contents of the register 502 and the incoming register 501 are asserted in parallel by a multiplexor 532 on the leads of the primary bus 10. Only in an instance of a time slot (TS) 19 occurrence, which is indicated by a rising edge of a decode 18, in FIG. 6, will the mulitplexor 532 gate Z bus signal states to the P bus 10. A half cycle of the same system clock signal after the falling edge of the said same C690 clock signal, the three orthogonal registers 501, 502 and 503 are clocked, resulting in the incoming register 501 accepting said starting bits, the outgoing register 503 moving the second outgoing bit to the multiplexor 535 and the register 502 moving 8 bits of the TDMT path 21 toward the multipletor 532. At the same time the incoming register 501 moves the remaining two bits toward the multipletor 532 via a multiplexor 531 553, the next two outgoing parallel information bytes are moved through a data holding registers 504 and 505, under control of timing signals SM2 and SM6, and hence into the register 502. At the same moment, as before described, the register 501 stores the first two bits of each incoming TDMT channel. Once the first two bits have occurred, the registers 501 and 503 receive no further clock signals until the start of the next outgoing time slot sequence when all 10 registered bits are shifted in parallel toward the P bus 10.

At the start of the next time slot sequence, registors 501 and 503 are caused to move their respective contents (2 bits) vertically, that is upwardly in FIG. 5. Thereafter the next eight TDMT bits are shifter vertically into the register 502 and the previous contents are likewise shifted out to be transmitted via the multiplexer 535 and the TDMR paths 11 and 21. The horizontal directional control signals and the vertical directional control signals continue to be alternately asserted thereby repeating the parallel to the serial and serial to parallel cycle for each TDM channel on TDM paths 11 and 21.

Figure 7:
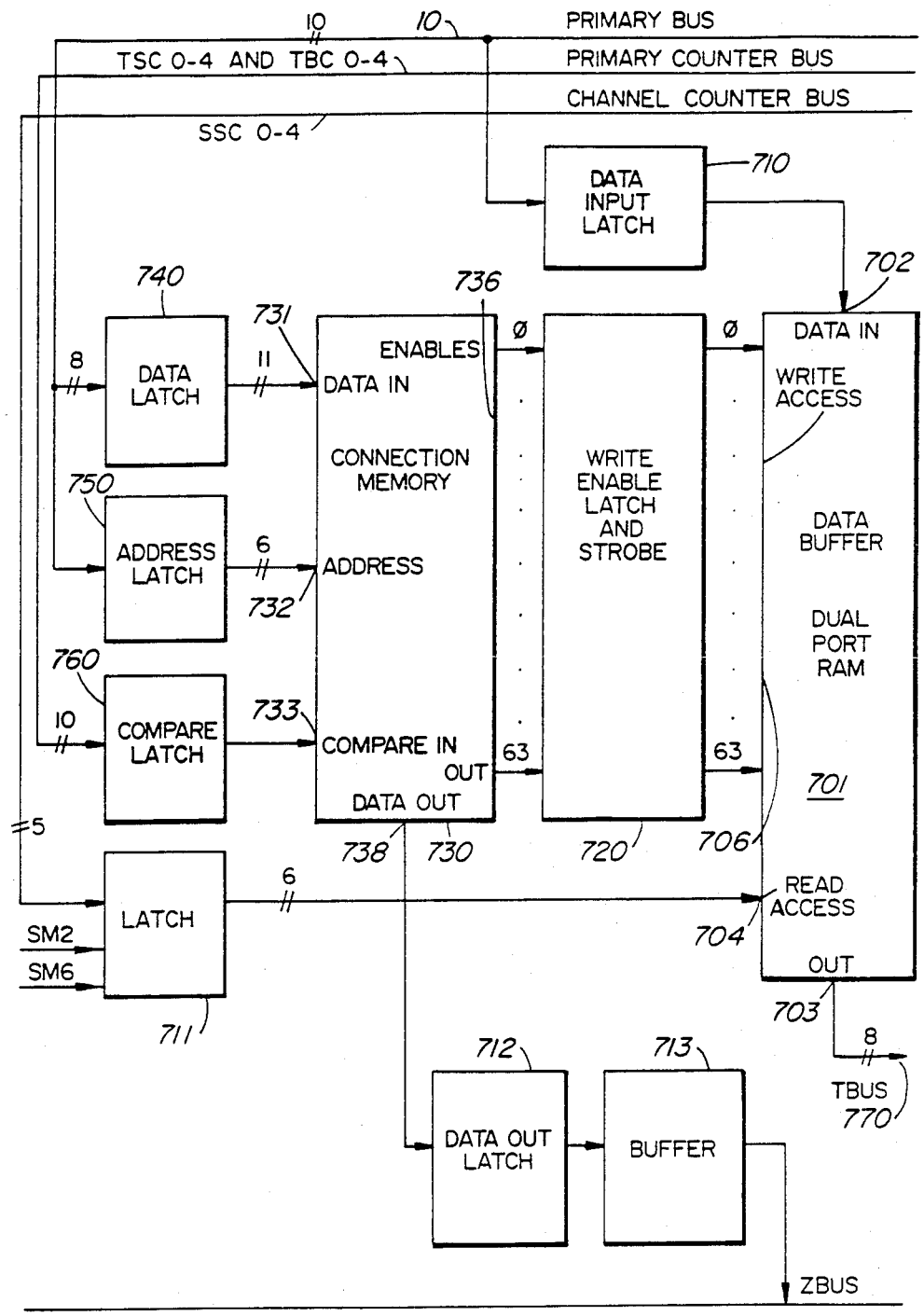
FIG. 7 is a block schematic diagram cf a time switch circuit used in the circuit switch module in FIG. 1 to provide circuit switched communication paths in the digital key telephone.

The time switch circuit in FIG. 7 provides for a timely transfer of 8 information bits from one of the 640 time slots on the primary bus 10 to a parallel T bus input of the parallel input multiplexor 506 of the converter circuit in FIG. 5, and thereby ultimately to a TDM path (11 or 21) time slot, as directed by the call controller 8. The information bits of each time slot on the P bus 10 are momentarily captured by a data input latch circuit 710 and thereafter applied at an input 702 of a dual port random access memory (RAM) 701. The dual port RAM 701 includes an output 703 which drives a T bus 770 in response to a six bit address applied at a read access address port 704. The RAM 701 differs from a typical dual port memory device in that for the purpose of storing information received at its input 702, it does not include the typical address decode circuitry. Instead, each write address is decoded and applied to an individual one of 64 write enable leads at 706. The decoded write address is timed via a write enable latch and strobe circuit 720. Any number of the write enable leads may be asserted by the circuit 720 simultaneously. The dual port RAM 701 responds, to a signal assertion or signal assertions on any or all of its 64 write enable leads at 706, by storing the signal states of said 8 information bits at the corresponding memory location or locations as the case may be. For example, if none of the leads at 706 is asserted, no storage locations are written. If one or more of the leads at 706 is asserted, the one or more corresponding storage locations are written. Reading of the 64 dual port RAM storage location sequentially occurs, on a regular and periodic basis, under the control of a flip flop, not shown, in the latch 711 which is toggled by signals SM2 and SM6, and the 32 sequentially generated TDM channel addresses which are generated by the counter 113 in FIG. 4.

A connection memory 730 contains information as to the actual time slots of the 640 P bus 10 time slots from whence information bit states are stored in the dual port RAM 701. The connection memory 730 is provided by a content addressable memory which includes an eleven bit data input port 731, a six bit address port 732 and a 10 bit compare address port 733. The general structure and operation of content addressable memories in known. In this example P bus addresses, from whence information is to be stored, are lodged in memory locations in the connection memory 730. Each of 64 memory locations, not shown, correspond with a separate one of 64 output leads at 736. A digital comparitor, not shown, is associated with each of the 64 memory locations such that addresses appearing at the compare port 733 are each compared with the information stored at each of the 64 memory locations. In every instant where the address at the compare port 733 and the information at a memory location is the same and the memory location also includes an asserted validity bit, the corresponding one of the 64 output leads at 736 is asserted. The asserted state is eventually transferred via the circuit 720 to the dual port RAM 701, which responds as previously described.

Operation of the digital key telephone system is directed by the call controller 8, which uses 32 dedicated time slots on the P bus 10 for lodging information into the memory locations of the connection memory 730 via a data latch circuit 740 and an address latch circuit 750. The information is delivered from the call controller 8 in the form of four bytes each of which occupies time slot 19 of 4 sequentially occurring time blocks on the P bus 10. The four bytes include a command byte, followed by an address byte, a low order data byte, and a higher order data byte. Each of these bytes is asserted along with a validity signal on one of the two remaining leads of the P bus 10 which indicates that the bytes are in fact an instruction from the call controller 8. A portion of the command byte specifies either a write or a read function intended for one of a connection memory, a source connection memory or a destination connection memory. A comparitor responds to the validity signal and a match between a remaining portion of the command byte and the ID0-3 by causing the address latch to store the. next byte, that is the address byte. Thereafter the data latch 740 captures 11 bit states of the low and higher order bytes, which are subsequently stored in the memory location of the connection memory 730 as indicated by six address bits asserted by the address latch 750. Provision is also made for the call controller 8 to confirm the information content of any address in the connection memory. In this case the command byte indicates the read function, and the address byte indicates the memory location to be read. The subsequent low and higher order bytes are driven by the stored information from a data output 738 of the connection memory 730 and via an output latch 712 and buffer 713 to the Z bus and thence via the multiplexor 532 in FIG. 5 onto the P bus 10.

Figure 8:
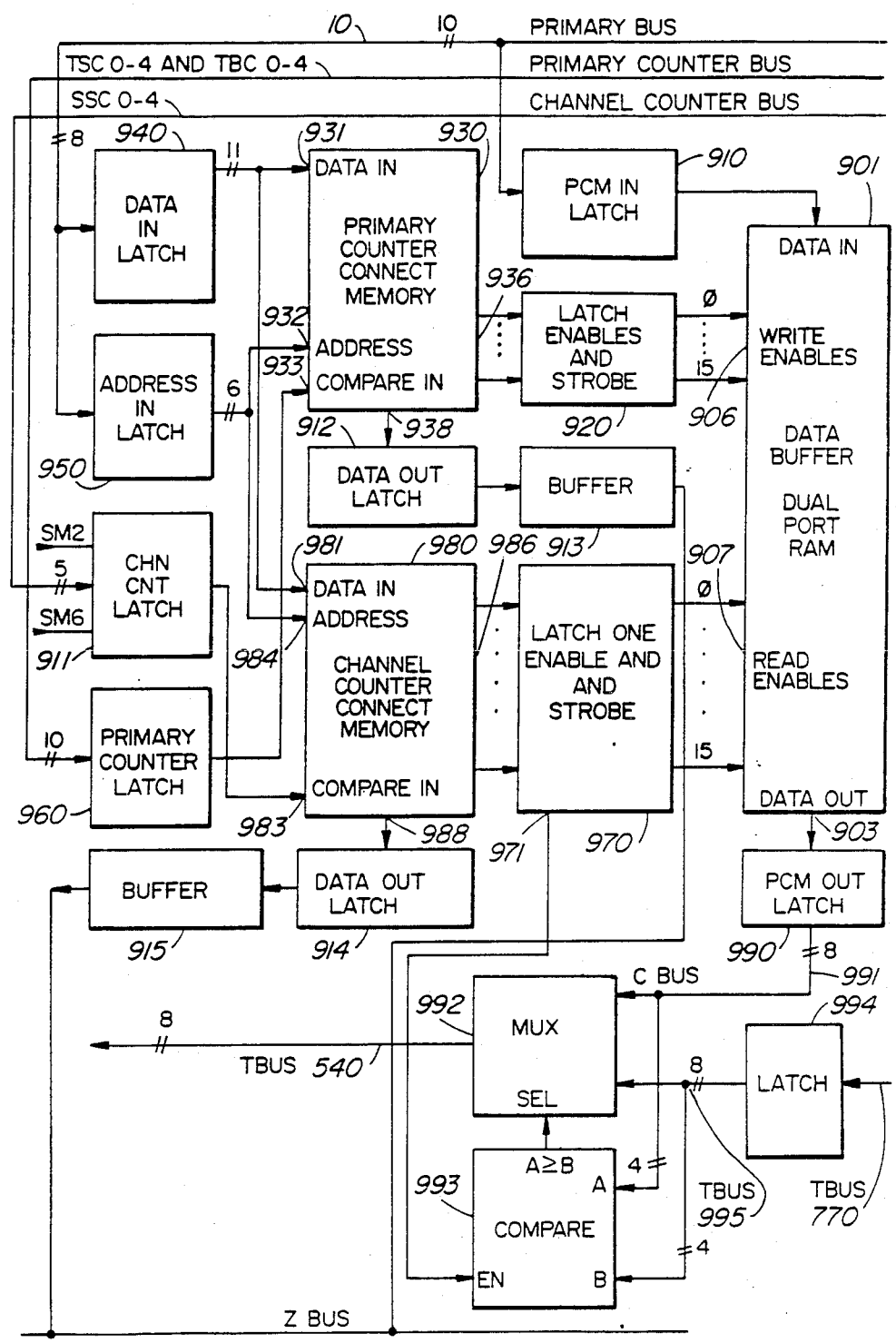
FIG. 8 is a block schematic diagram of a time switch conference circuit in the circuit switch module and used in combination with the time switch circuit of FIG. 7 to provide a conference feature in the digital key telephone system.

The time switch conference circuit in FIG. 8 provides a three party conference feature in the digital key telephone system. The time switch conference circuit adds an ability for a timely transfer of 8 information bits from another of the 640 time slots on the P bus 10, ultimately to, for example, said TDM path time slot previously referred to at the beginning of the discussion of FIG. 7. Very briefly by way of introduction, bytes are presented to a multiplexor 992 via the T buses 770 output from FIG. 7 and via a conference C bus 991. The four most significant bits (not including the sign bits) of each byte are compared in a comparitor 993 which directs the multiplexor 992 to assert the 8 bits from the C bus 991 on the T bus 540 in the event that the value of the 4 bits from the C bus 991 is equal or greater than a value of the 4 bits from the T bus 995. In the event the T bus 995 value in greater, then the 8 bits from the T bus 995 are asserted on the T bus 540 by the multiplexor 992. Thus a three party conference call maybe implemented wherein each party hears only the instant loudest speaking party of the other two parties.

Considering the time switch. conference circuit of FIG. 8 in more detail, the information bits of each time slot on the P bus 10 are momentarily captured by a PCM input latch 910 and thereafter applied at an input 902 of a dual port RAM 901. The dual port RAM 901 includes an output 903 which is buffered to the C bus 991 via a PCM output latch circuit 990. Likewise the T bus 770 is buffered to the T bus 995 via a latch circuit 994. The dual port RAM 901 differs from the dual port RAM 701 in that it has only 16 memory locations and lacks typical address decode circuitry for the purpose of reading out information stored at these memory locations. Each write address is decoded and applied to an individual one of 16 write enable leads at 906 and likewise each read address is decoded and applied at an individual one of 16 read enable leads at 907. The decoded write address is timed via a write enable latch and strobe circuit 920. Likewise the decoded read address is timed via a read enable latch and strobe circuit 970. The read enable latch and strobe circuit 970 also includes an EXCLUSIVE OR logic circuit not shown, which responds to a single decoded read address occurrence by asserting a compare enable signal on a lead 971. The compare enable signal is used to activate the selection function of the comparitor circuit 993, which in the absence of the compare enable signal causes the multiplexor 992 to assert the T bus 995 bit states onto the T bus 540, exclusively. Hence if no decoded read address or more than one decoded read address is asserted at inputs of the read enable latch and strobe circuit 970, the conference function does not occur. The dual port RAM 901 responds, to a signal assertion on a write enable lead at 906, by storing the signal states of said 8 information bits at the corresponding memory location. Likewise, reading of a memory location in the dual port RAM 901 occurs in response to a corresponding read enable lead at 907 being asserted.

A source connection memory 930 contains information as to the actual P bus time slots from whence information bit states are stored in the dual port RAM 901. The source connection memory 930 is provided by a content addressable memory having 16 memory locations, not shown, each corresponding to a separate one of 16 output leads at 936. The source connection memory 930 includes an eleven bit data port 931, a six bit address port 932 and a ten bit compare address port 933. A digital comparitor, not shown. is associated with each of the 16 memory locations such that addresses appearing at the compare port 933 are each compared with the information stored at each of the 16 memory locations. In an instant where the address at the compare port 933 and the information at a memory location are the same and the memory location also includes an asserted validity bit, the corresponding one of the 16 output leads at 936 is asserted. The asserted state represents a decoded write address, which is subsequently transferred via the circuit 920 to the dual port RAM 901 which responds as previously described.

A destination connection memory 980 contains information as to the actual TDMR time slots on the TDM paths 11 and 21 to which information bit states stored in the dual port RAM 901 may be directed via the multiplexor 992 and the T bus 540. The destination connection memory 980 is of a structure similar to that of the previously described source connection memory 930. Addresses appearing at a compare port 983 are each compared with information stored at each of 16 memory locations. In an instant where the information at the compare port 983 and the information at a memory location are the same and the memory location also includes an asserted validity bit, a corresponding one of 16 output leads at 986 is asserted. The EXCLUSIVE OR logic circuit in the read enable latch and strobe circuit 970 permits the corresponding read enable lead at 907 to be asserted, which causes the dual port RAM 901 to read out the 8 information bit states from the corresponding memory location as previously described.

The information appearing at the compare port 983 is asserted from the channel counter bus leads SSC 0-4 by a channel counter latch circuit 911. The latch circuit 911 also includes a flip flop, not shown, which is toggled by the timing signals SM2 and SM6 and thereby provides 6 addresses per frame, similar to that previously discussed in relation to the latch circuit 711.

Operation of the conference function in the digital key telephone system is directed by the call controller 8, which uses the 32 dedicated time slots on the P bus 10 for lodging information into the memory locations of the source connection memory 930 and the destination connection memory 980 via a data latch circuit 940 and an address latch 950 in a manner similar to that previously discussed in relation to the connection memory 730. Likewise the call controller 8 may confirm the information content of the source connection memory 930 by way of a data output 938, a data output latch circuit 912, a buffer circuit 913 and the Z bus, connected as shown in FIG. 8. Information content of the destination connection memory is also available to the call controller 8 by way of a data output 988, a data output latch circuit 914, a buffer circuit 915, and the Z bus, connected as shown in FIG. 9.

What is claimed is:

1. A digital key telephone system for providing communication paths, as directed by a call controller, between digital signal communications (DSC) terminals via line appearances provided by corresponding digital signal ports, the digital key telephone system comprising:
   a time division multiplex (TDM) serial transmission path, being connected to a predetermined plurality of said digital signal ports, for providing a predetermined plurality of time division multiplex transmit (TDMT) and receive (TDMR) channels in fixed pair relationship with each of the said digital signal ports, the TDMT and TDMR channels residing in respective transmit and receive serial bit streams, and being of a fixed time slot interval for transmission of a fixed plurality of bit occurrences in excess of a predetermined plurality of m information bits;
   a first transmission bus including a plurality of at least m parallel signal paths;
   timing means for defining predetermined TDM frame intervals and channel occurrences, in the TDM serial transmission path, and for defining time slot occurrences being a whole number multiple of said channel occurrences during one of said frame intervals, in relation to the first TDM parallel bus, in response to timing signals from the call controller;
   a circuit switch module being connected between the TDM serial transmission path and the first transmission bus and comprising:
   a module transmission bus including a plurality of m parallel signal paths;
   conversion circuit means for transferring the TDMT serial bit stream states of each channel occurrence to one of the first and module transmission buses and for transferring bit states of the m parallel signal paths of the other of said first and module transmission buses to the TDMR serial bit stream during corresponding channel occurrences;
   time switch means, being connected between the first transmission bus and the module transmission bus, for storing bit states, from one of the first bus and the module bus said bit states being those occurring during time slot intervals having been defined by the call controller, and transferring the stored bit states to the other of said buses in response to the defined channel occurrences from the timing means.

2. A digital key telephone system for providing communication paths, as directed by a call controller, between digital signal communications (DSC) terminals via line appearances provided by corresponding digital signal ports; the digital key telephone system comprising:
   a first transmission bus including more than m parallel conductors;
   a TDM serial transmission path having at least one TDMT transmit and TDMR receive channel in fixed association with each of said digital signal ports, each of said channels being capable of transmitting a plurality of bit states corresponding in number to said parallel conductors;
   a circuit switch module being connected between the first transmission bus and the TDM serial transmission path, comprising:
   timing means for defining TDM frame intervals and serial channel addresses, and for defining parallel time slot addresses being a whole number multiple of occurrences of said serial channel addresses during each TDM frame interval;
   a module transmission bus consisting of m parallel conductors;
   conversion means for transferring serial bit states from each TDMT channel to the parallel conductors of the first bus during predetermined time slots, and for transferring bit states from the m parallel conductors of the module bus to each TDMR channel occurrence;
   time switch means being responsive to the timing means for storing bit states from the first bus and occurring in time slots as defined by the call controller and at memory locations as defined by the call controller, and transferring bit states to the module bus from said memory locations as accessed in response to said serial channel addresses.

3. A digital key telephone system as defined in claim 2, wherein the conversion circuit comprises:
   first, second and third orthogonal memory arrays;
   said first array for serially receiving bit states from each of the TDMT channels and, on a channel by channel basis, transferring m bit states to the second array sequentially for parallel assertion on the m conductors of the first bus and for asserting at least one bit state, in excess of said m bit states, on a corresponding conductor of the first bus;
   said second array for asserting m bit states on the first bus and having just asserted said m bit states on the first bus, then accepting m bit states in parallel from the module bus, and at one of the second array for sequentially asserting said bit states in a corresponding TDMR channel for transmission to the corresponding digital signal port, meanwhile at the other end of the array for sequentially receiving the m bits of the corresponding TDMT channel for the first array;
   said third array from accepting a bit state having originated at the call controller and destined for the corresponding TDMR channel and for asserting said bit state at a predetermined moment in said TDMR channel interval.

4. A digital key telephone system as defined in claim 2 wherein the circuit switch module provides connection for two TDM paths and the conversion circuit is adapted to perform the TDMT and TDMR parallel conversion on an interleaved channel by channel basis.

5. A digital key telephone system as defined in claim 2 further comprising; a plurality of the circuit switch modules each module being connected with a hard wired unique identification code and wherein the timing means in each of the circuit switch modules is responsive to said unique identification code whereby the associated TDM frame intervals are distributed in phase, and wherein said whole number, defining said whole number multiple, corresponds to one plus a maximum number of circuit switch modules being connectable to the first bus.

6. A method for operating a digital key telephone system comprising the steps of:
  (a) defining sequential frame intervals and a number, of x sequential channel intervals within each of the frame intervals, and during each channel interval receiving a number, of m information bits and at least one other bit between x/2 respective fixed two channel connected digital signal port positions and a fixed x channel connected circuit switch position;
  (b) performing step (a) at up to y circuit switch positions and associated digital signal port positions;
  (c) at each circuit switch position asserting bit states, transmitted in each channel interval, in parallel on corresponding parallel leads of a first bus at a fixed exclusively corresponding time slot occurrence in xy time slot occurrence per frame interval;
  (d) at a call controller reading the states of said other bits from the first us for transmit channel related sequentially encoded information pertinent to telephone call progress, and coincidentally asserting appropriate other bit states for ultimate reception at the digital signal port position;
  (e) at each circuit switch position, capturing m bits states from the first bus during time slot occurrences as designated by the call controller and storing each of the m captured bit states at up to x of x channel associated memory location s as designated by the call controller;
  (f) sequentially reading m bit states from each of the x memory locations in synchronism with occurrences of said x sequential channel intervals defined in step (a);
  (g) in a first case of having read a designated memory location, transmitting the m bit states within the channel interval for reception at the associated digital signal port location, in the second case of having read a non designated memory location, transmitting a predetermined m bit states, representing an idle code, within the channel interval for reception at the associated digital signal port location, and in any case transmitting said other bit state as being provided at the instant by step (d) for reception at the associated digital signal port location.

7. A method for operating a digital signal communication path in a digital key telephone system comprising the steps of:
  (a) sequentially transferring bit states, from a serial frame and origin channel organized first transmission medium, to exclusively dedicated time slots in a parallel frame organized transmission medium;
  (b) designating at least one of said time slots from which bit states are to be stored in a first memory having a plurality of memory locations each corresponding to possible destination channels of a serial frame and channel organized second transmission medium, designating one of said memory locations in association with each of said designated time slots, and with each occurrence of a designated time slot, storing said bit states in said designated memory location;
  (c) in synchronism with the channel occurrences of the second transmission medium reading each of the corresponding memory locations;
  (d) asserting bit states, while being read from each designated memory location, in a second parallel organized transmission medium and otherwise asserting predetermined bit states;
  (e) capturing the bit states as they occur in the second parallel organized transmission medium and asserting the last captured bit states serially during the corresponding instant channel of the serial frame and channel organized second transmission medium whereby information is transmitted into the digital key telephone system in an origin channel and routed out of the digital key telephone system in a destination channel.

8. A method for operating a digital signal communication path as defined in claim 7, comprising the further steps of:
  (f) designating one other of said time slots from which bit states are to be stored in a second memory, having at least one memory location, and storing said bit states therein;
  (g) designating a channel in the serial frame and channel organized second transmission medium;
  (h) asserting the bits states, stored in the memory location of the second memory, in a third parallel organized medium at a time corresponding to an occurrence of channel designated in step (g);
  (i) selecting one of the second and third parallel organized mediums in accordance with which of the respective bit states asserted therein is of a higher value, and;
  in step (e) capturing said bit states from the selected medium,
  whereby the information in one of two origin channels is selected and routed out of the digital key telephone systems in said destination channel, to provide a voice conference function at a telephone station set corresponding to the destination channel.

9. A key telephone system for providing digital signal communication paths between a plurality of digital signal instruments and for providing a communication link between any of said instruments and a communication channel associated with a telephone exchange, comprising:
  a switching means being operable to provide communication paths between time division multiplexed transmit (TDMT) channels and time division multiplexed receive (TDMR) channels;
  a plurality of time division multiplex (TDM) communication paths, each TDM communication path including a number of n pairs of the TDMT and TDMR channels in serial transmit and receive bit streams respectively;

a plurality of digital signal communication paths, each for connecting one of the digital signal instruments to the key telephone system;

internal port means associated with one of the plurality of TDM communication paths, for receiving information for a plurality of the TDMR channels and transmitting corresponding information to prearranged corresponding ones of the plurality of digital signal communication paths, and for receiving information from said ones of said digital signal communication paths and transmitting corresponding information to the corresponding TDMT channels;

external port means for coupling information signals between said communication channel associated with said telephone exchange and at least one pair of the TDMR and TDMT channels;

a call controller being responsive to signals from any of the digital signal terminals and the telephone exchange for directing call progress operations of the switching means; and wherein a maximum of n/2 digital signal communication paths are each associated with a prearranged pair of the TDMT and TDMR channels via the internal port means whereby in operation more than one independent telecommunication link may be provided in co-existence for any of the digital signal instruments.

10. A key telephone system for providing digital signal communication paths between a plurality of digital signal instruments and for providing a communication link between any of said instruments and a communication channel associated with a telephone exchange, comprising:

a switching means being operable to provide communication paths between time division multiplexed transmit (TDMT) channels and time division multiplexed receive (TDMR) channels;

a plurality of time division multiplex (TDM) communication paths, each TDM communication path including a number of n pairs of the TDMT and TDMR channels in serial transmit and receive bit streams respectively;

a plurality of digital signal communication paths, each for connecting one of the digital signal instruments to the key telephone system;

internal port means associated with one of the plurality of TDM communication paths, for receiving information for a plurality of the TDMR channels and transmitting corresponding information to prearranged corresponding ones of the plurality of digital signal communication paths, and for receiving information from said ones of said digital signal communication paths and transmitting corresponding information to the corresponding TDMT channels;

external port means for coupling information signals between said communication channel associated with said telephone exchange and at least one pair of the TDMR and TDMT channels;

a call controller being responsive to signals from any of the digital signal terminals and the telephone exchange for directing call progress operations of the switching means; and wherein the switching means comprises:

a parallel bus for providing m bit time sots being synchronized with a bit rate of the serial bit streams;

a first transfer means for communicating information from a serial bit stream to the parallel bus;

a second transfer means for communicating information to a serial bit stream from the parallel bus.

11. A digital telephone system for providing communication paths, as directed by a call controller, between line appearances, the system comprising:

a first transmission bus including more than m parallel conductors;

a TDM serial transmission path having at least one transmit (T) channel and receive (R) channel in fixed association with each of a plurality of the line appearances, each of said channels being capable of transmitting bit states corresponding in number to said parallel conductors;

a circuit switch module being connected between the first transmission bus and the TDM serial transmission path, comprising:

timing means for defining TDM frame intervals and serial channel addresses, and, for defining parallel time slot addresses being a whole number multiple of occurrences of said serial channel addresses during each TDM frame interval;

first and second module transmission buses each consisting of m parallel conductors;

conversion means for transferring serial bit states from each TDMT channel to the parallel conductors of the first bus during predetermined time slots, and for transferring bit states from the m parallel conductors of either of the module buses to each TDMR channel occurrence;

first time switch means being responsive to the timing means for storing bit states, occurring in time slots in the first transmission bus as defined by the call controller, at memory locations, corresponding to TDMR channels defined by the call controller, and for transferring bit states to the first module bus from said memory locations as defined by said serial channel addresses, second time switch means being responsive to the timing means for storing bit states, occurring in time slots in the first transmission bus as defined by the call controller, at a memory location defined by the call controller, and for transferring bit states to the second module bus from one of said memory locations being designated by the call controller as being in association with ones of said serial channel addresses;

selection means being responsive to the values of coincidentally occurring bit states on the first and second module buses for directing the conversion means to transfer the bit states from one of the first and second module buses exclusively, whereby capability of conference communication between any three of said line appearance is provided within the circuit switch module.

* * * * *

UNITED STATES PATENT AND TRADEMARK OFFICE
CERTIFICATE OF CORRECTION

PATENT NO. : 4,873,682

DATED : October 10, 1989

INVENTOR(S) : Irwin et al

It is certified that error appears in the above-identified patent and that said Letters Patent is hereby corrected as shown below:

On the title page, item [75] add as an inventor

--Alan S. J. Chapman--

Signed and Sealed this

Thirteenth Day of November, 1990

Attest:

HARRY F. MANBECK, JR.

*Attesting Officer*      *Commissioner of Patents and Trademarks*